(12) United States Patent
Zou

(10) Patent No.: US 12,658,422 B2
(45) Date of Patent: Jun. 16, 2026

(54) ELECTROCHEMICAL DEVICE AND ELECTRONIC DEVICE

(71) Applicant: NINGDE AMPEREX TECHNOLOGY LTD., Ningde City (CN)

(72) Inventor: Bangkun Zou, Ningde City (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 787 days.

(21) Appl. No.: 17/956,272

(22) Filed: Sep. 29, 2022

(65) Prior Publication Data

US 2023/0040107 A1 Feb. 9, 2023

Related U.S. Application Data

(63) Continuation of application No. PCT/CN2020/082250, filed on Mar. 31, 2020.

(51) Int. Cl.
*H01M 4/13* (2010.01)
*H01M 4/36* (2006.01)
(Continued)

(52) U.S. Cl.
CPC ............. *H01M 4/13* (2013.01); *H01M 4/366* (2013.01); *H01M 10/0525* (2013.01); *H01M 50/531* (2021.01); *H01M 2010/4292* (2013.01)

(58) Field of Classification Search
CPC ... Y02E 60/10; H01M 4/13; H01M 2004/021; H01M 2010/4292
See application file for complete search history.

(56) References Cited

U.S. PATENT DOCUMENTS

2003/0099880 A1* 5/2003 Park .................... H01M 50/571
429/246
2009/0246612 A1* 10/2009 Naoi ................... H01M 50/414
429/246
(Continued)

FOREIGN PATENT DOCUMENTS

CN 101286574 A 10/2008
CN 102306778 A 1/2012
(Continued)

OTHER PUBLICATIONS

ISR for International Application PCT/CN2020/082250 mailed Dec. 30, 2020.
(Continued)

*Primary Examiner* — Kaj K Olsen
(74) *Attorney, Agent, or Firm* — Maier & Maier, PLLC

(57) ABSTRACT

An electrochemical device includes a negative electrode plate including a negative current collector provided with a negative active material layer and a positive electrode plate including a positive current collector provided with a positive active material layer. The positive active material layer includes a first region. The first region includes a second region and a third region that does not overlap the second region by any area. A first insulation layer is disposed on a surface of the second region. The negative active material layer includes a fourth region facing towards the third region. An area S2 $mm^2$ of the second region and an area S1 $mm^2$ of the first region satisfy: $S2 < S1 \leq 1.5 S2$, and a ratio CB of a unit-area capacity of the fourth region to a unit-area capacity of the third region is greater than or equal to 1.1.

19 Claims, 6 Drawing Sheets

(51) Int. Cl.
    H01M 10/0525    (2010.01)
    H01M 50/531    (2021.01)
    *H01M 10/42*    (2006.01)

(56) References Cited

U.S. PATENT DOCUMENTS

| | | | |
|---|---|---|---|
| 2011/0206988 A1 | 8/2011 | Tanaka et al. | |
| 2015/0279577 A1* | 10/2015 | Uchida | H01G 11/60 |
| | | | 429/324 |
| 2016/0093912 A1 | 3/2016 | Zheng et al. | |
| 2017/0179461 A1* | 6/2017 | Moon | H01M 4/664 |
| 2017/0373299 A1* | 12/2017 | Takeda | H01M 4/0416 |
| 2019/0067676 A1 | 2/2019 | Nagamitsu et al. | |
| 2020/0343558 A1* | 10/2020 | Liang | H01M 4/661 |

FOREIGN PATENT DOCUMENTS

| | | | | |
|---|---|---|---|---|
| CN | 203521537 U | 4/2014 | | |
| CN | 203733894 U | 7/2014 | | |
| CN | 105449264 A | 3/2016 | | |
| CN | 105576191 A | 5/2016 | | |
| CN | 105990610 A | 10/2016 | | |
| CN | 205992575 U | 3/2017 | | |
| CN | 109817884 A | 5/2019 | | |
| CN | 208819985 U | 5/2019 | | |
| CN | 110660963 A | 1/2020 | | |
| CN | 110660999 A | 1/2020 | | |
| CN | 110752346 A | 2/2020 | | |
| CN | 110931800 A | 3/2020 | | |
| CN | 110931800 B | * 11/2020 | ......... | H01M 10/052 |
| KR | 102086783 B1 | 3/2020 | | |

OTHER PUBLICATIONS

Written Opinion for International Application PCT/CN2020/082250 mailed Dec. 30, 2020.
Extended Search Report issued on Oct. 31, 2023, in corresponding European Application No. 20929306.7, 5 pages.
Office Action issued on Oct. 16, 2023, in corresponding Chinese Application No. 202080008267.9, 14 pages.

\* cited by examiner

100

22 12 10 20 30 126

ELECTROCHEMICAL DEVICE AND ELECTRONIC DEVICE

CROSS-REFERENCE TO RELATED APPLICATION

The present application is a continuation application of PCT application Serial No. PCT/CN2020/082250, filed on Mar. 31, 2020, the content of which is incorporated by reference in its entirety.

TECHNICAL FIELD

This application relates to the field of energy storage, and in particular, to an electrochemical device and an electronic device containing the electrochemical device.

BACKGROUND

Currently consumer electronic products have a tendency of miniaturization, multi-function, and a high charge rate, and safety performance of electrochemical devices in the products is of higher concern.

During manufacture of an electrochemical device, in order to prevent a lithium, plated negative electrode from piercing a separator or prevent metal burrs from piercing the separator to cause a short circuit between a positive plate and a negative electrode plate, insulation tape needs to be affixed to a given position of the positive electrode plate. However, during charge-and-discharge cycles of the battery, a positive active material layer at an edge overlaid with the insulation tape on the positive electrode plate still incurs delithiation. Consequently, metallic lithium is precipitated in some regions of a surface of the negative electrode plate due to over-lithiation. The precipitated metallic lithium is prone to pierce the separator and cause a short circuit of the electrochemical device, thereby impairing safety and reliability of the electrochemical device.

SUMMARY

In view of the defects in the prior art, it is necessary to provide an electrochemical device to solve at least one of the technical problems in the prior art.

Through in-depth research, the inventor of this application finds that lithium plating on the negative electrode plate corresponding to regions around a first insulation layer can be avoided and the safety and reliability of the electrochemical device can be enhanced by controlling a ratio to fall within a specified range, where the ratio is a ratio of the quantity of lithium ions that can be intercalated into the negative active material in a region of a specified area to the quantity of lithium ions that can be deintercalated from a corresponding region of the positive electrode plate.

To achieve the foregoing objective, this application provides the following solutions.

This application provides an electrochemical device, including a negative electrode plate and a positive electrode plate. The negative electrode plate includes a negative current collector. The negative current collector includes a first surface. A negative active material layer is disposed on the first surface. The positive electrode plate includes a positive current collector. The positive current collector includes a second surface facing towards the first surface. A positive active material layer is disposed on the second surface. The positive active material layer includes a first region. The first region includes a second region and a third region. A first insulation layer is disposed on a surface of the second region. The third region is a region that does not overlap the second region by any area in the first region. The negative active material layer includes a fourth region facing towards the third region. An area S2 mm$^2$ of the second region and an area S1 mm$^2$ of the first region satisfy a relation: S2<S1≤1.5S2, and a ratio CB of a unit-area capacity of the fourth region to a unit-area capacity of the third region is greater than or equal to 1.1.

In the electrochemical device according to this application, it is satisfied that the ratio of the unit-area capacity of the fourth region to the unit-area capacity of the third region is greater than or equal to 1.1. In this way, the lithium ions deintercalated from the positive active material layer overlaid at the edge of the first insulation layer can be received by the fourth region of the negative active material, thereby solving the problem of lithium plating on the negative electrode plate corresponding to the regions around the first insulation layer and enhancing safety and reliability of the electrochemical device.

In some embodiments of this application, the unit-area capacity of the fourth region is greater than a unit-area capacity of a region of the negative active material layer different from the fourth region. By increasing the unit-area capacity of the fourth region, this application can increase the ratio of the unit-area capacity of the fourth region to the unit-area capacity of the third region, so as to reduce risks of lithium plating on the surface of the negative active material layer and improve safety and reliability.

The region of the negative active material layer different from the fourth region includes a first negative active material. A superficial layer of the fourth region includes a second negative active material. A gram capacity of the second negative active material is greater than a gram capacity of the first negative active material. The negative active material with a relatively high gram capacity is disposed in the fourth region. In this way, the gram capacity of the second negative active material is greater than the gram capacity of the first negative active material. Therefore, the quantity of lithium ions that can be intercalated into the second negative active material is greater than a normally required value, thereby helping to intercalate more lithium ions that are deintercalated from the positive active material layer, preventing lithium plating on the negative electrode plate, and improving safety and reliability of the electrochemical device.

In some embodiments of this application, a lithiation potential versus Li/Li$^+$ of the second negative active material is 0.2 V to 3.0 V. This not only avoids further lithium plating on the second negative active material caused by a deficient lithiation potential (less than 0.2 V) of the second negative active material, but also avoids an excessive lithiation potential (higher than 3.0 V) of the second negative active material. The excessive lithiation potential has to be matched by a positive active material of a higher potential.

In some embodiments of this application, the second negative active material includes at least one of transition metal oxide, lithium titanium oxide, graphene, hard carbon, soft carbon, silicon, silicon-oxygen compound, silicon-carbon compound, artificial graphite, natural graphite, mesocarbon microbead, phosphorus, or sulfur.

In some embodiments of this application, a thickness of the superficial layer of the fourth region is less than or equal to 50 μm. By avoiding increase of the thickness of the electrochemical device caused by an excessively thick superficial layer of the fourth region, the increase of an ion transmission distance caused by the excessive thickness of the superficial layer of the fourth region can be avoided.

In some embodiments of this application, a groove is provided in a negative active material layer. A negative tab is accommodated in the groove. The negative tab is electrically connected to the negative current collector. A projection of the groove on the positive active material layer is located in the second region. The embedded negative tab disposed can shorten a current transmission path, reduce an internal resistance of the electrochemical device, and improve the rate performance of the electrochemical device.

In some embodiments of this application, the area of the second region is equal to an area of the groove. This can reduce the working area of the first insulation layer, and reduce the cost; and can also increase the quantity of lithium ions that can be deintercalated from the positive active material layer and reduce the loss of energy density.

In some embodiments of this application, a second insulation layer is disposed on a surface of the negative tab. A distance between a surface that is of a superficial layer of the fourth region facing opposite to the negative current collector and the negative current collector is less than or equal to a distance between a surface that is of the second insulation layer facing opposite to the negative current collector and the negative current collector. The second insulation layer disposed on the surface of the negative tab can prevent burrs generated in cutting and joining (such as welding) of the negative tab from piercing the separator and causing a short circuit, thereby improving safety and reliability of the electrochemical device. In addition, controlling the thickness of the superficial layer of the fourth region helps to reduce the overall thickness of the electrochemical device.

In some embodiments of this application, the negative active material layer overlays the negative tab. On the one hand, this increases the amount of active material of the electrochemical device and increases the energy density. In addition, the negative active material layer that overlays the surface of the negative tab can cover the burrs generated in cutting and joining (such as welding) of the negative tab, avoid a short circuit caused by piercing of the separator, improve safety and reliability, and reduce the cost of disposing the insulation layer on the surface of the negative tab.

In some embodiments of this application, the third region includes a first positive active material. A region of the positive active material layer different from the third region includes a second positive active material. The unit-area capacity of the third region is less than a unit-area capacity of the region of the positive active material layer different from the third region. By reducing the unit-area capacity of the third region, the quantity of lithium ions that can be deintercalated from the third region is less than that in a normal circumstance, thereby increasing the ratio of the unit-area capacity of the fourth region to the unit-area capacity of the third region, avoiding lithium plating on the surface of the negative electrode plate, and improving safety and reliability.

In some embodiments of this application, a gram capacity of the first positive active material is less than a gram capacity of the second positive active material. To be specific, by coating the first region with a positive active material of a relatively low gram capacity, the quantity of lithium ions that can be deintercalated from the first positive active material is reduced, so as to avoid lithium plating on the surface of the negative electrode plate and improve safety and reliability.

In some embodiments of this application, a thickness of the third region is less than a thickness of the region of the positive active material layer different from the third region. To be specific, with the decrease of the thickness of the positive active material layer in the third region, the lithium ions that can be deintercalated from the third region are reduced, thereby avoiding lithium plating on the surface of the negative electrode plate and improving safety and reliability.

In some embodiments of this application, the third region is provided without the positive active material layer. To be specific, the third region is uncoated with or stripped of the positive active material, thereby avoiding lithium plating on the surface of the negative electrode plate and improving safety and reliability.

This application further provides an electronic device, including the electrochemical device described above.

REFERENCE NUMERALS OF MAIN COMPONENTS

| | |
|---|---|
| Electrochemical device | 100 |
| Negative electrode plate | 10 |
| Negative current collector | 12 |
| First surface | 122 |
| Negative active material layer | 124 |
| Superficial layer | 1244 |
| Groove | 125 |
| Negative tab | 126 |
| Second insulation layer | 128 |

5

-continued

| Positive electrode plate | 20 |
| Positive current collector | 22 |
| Second surface | 222 |
| Positive active material layer | 24 |
| Fir st insulation layer | 26 |
| Separator | 30 |
| First region | D1 |
| Second region | D2 |
| Third region | D3 |
| Fourth region | D4 |
| Electronic device | 200 |

This application is further described below with reference to the following specific embodiments and the foregoing drawings.

DETAILED DESCRIPTION

To make the foregoing objectives, features, and advantages of this application more comprehensible, the following describes this application in detail with reference to drawings and specific embodiments. It needs to be noted that to the extent that no conflict occurs, the embodiments of this application and the features in the embodiments may be combined with each other. For thorough understanding of this application, many details are given below. The embodiments described herein are merely a part of rather than all of the embodiments of this application. All other embodiments derived by a person of ordinary skill in the art based on the embodiments of the present invention fall within the protection scope of the present invention.

Unless otherwise defined, all technical and scientific terms used herein have the same meanings as usually understood by a person skilled in the technical field of this application. The terms used in the specification of this application herein are merely intended for describing specific embodiments but are not intended to limit this application. The term "and/or" used herein includes any and all combinations of one or more related items preceding and following the term.

Figure 1:
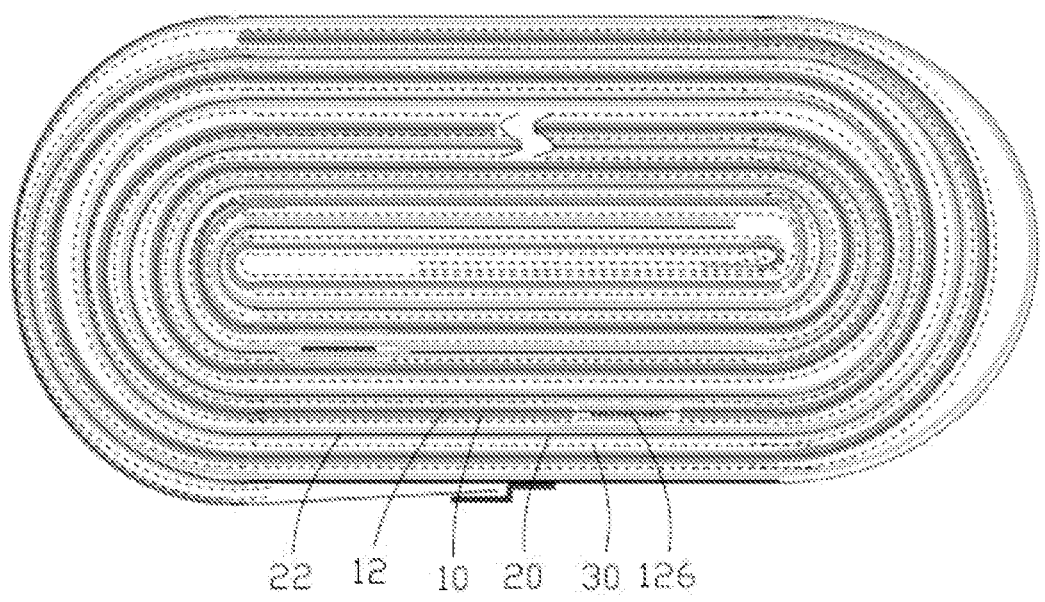
FIG. 1 is an schematic structural diagram of an electrochemical device according to an embodiment of this application.

As shown in FIG. 1, this application provides an electrochemical device 100. The electrochemical device 100 includes any device capable of electrochemical reactions. Specifically, the electrochemical device 100 includes all types of primary batteries, secondary batteries, and capacitors (such as supercapacitors). Optionally, the electrochemical device 100 may be a lithium secondary battery, including a lithium metal secondary battery, a lithium-ion secondary battery, a lithium polymer secondary battery, and a lithium-ion polymer secondary battery.

In this embodiment, the electrochemical device 100 includes a negative electrode plate 10, a positive electrode plate 20, and a separator 30. The separator 30 is located between the negative electrode plate 10 and the positive electrode plate 20. The electrochemical device 100 further includes an electrolytic solution. The electrolytic solution infiltrates the negative electrode plate 10, the separator 30, and the positive electrode plate 20.

Figure 2:
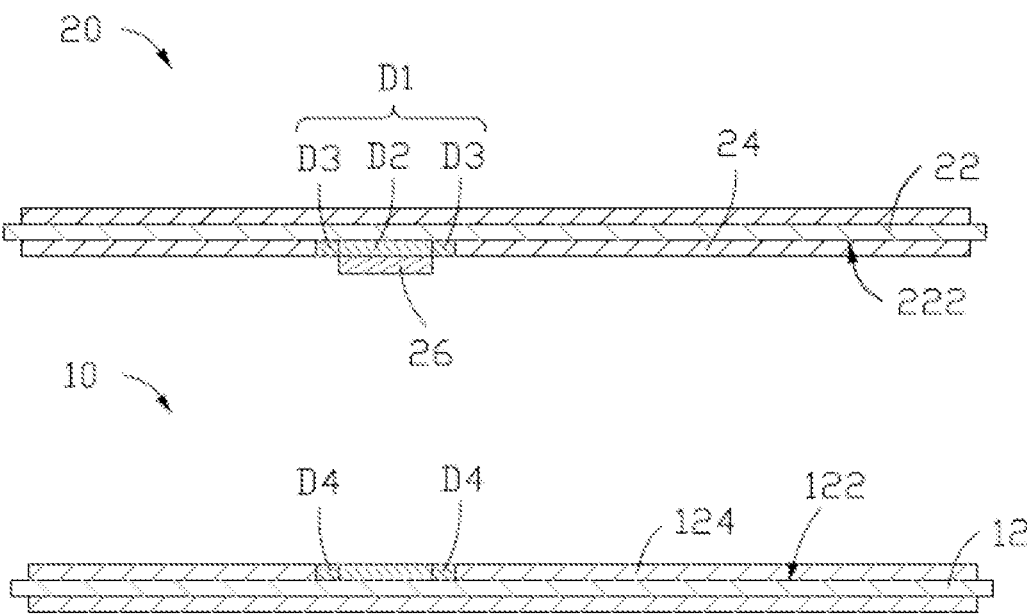
FIG. 2 is a schematic sectional view of a negative electrode plate and a positive electrode plate according to an embodiment of this application.
Figure 3:
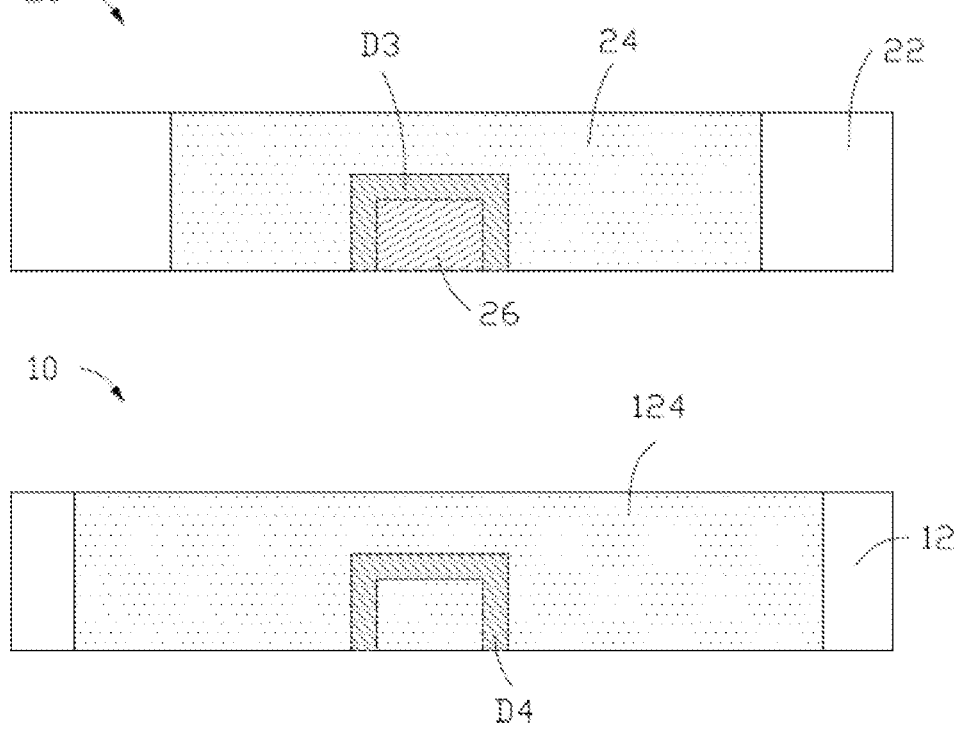
FIG. 3 is a top view of the negative electrode plate and the positive electrode plate shown in FIG. 2.
Figure 4:
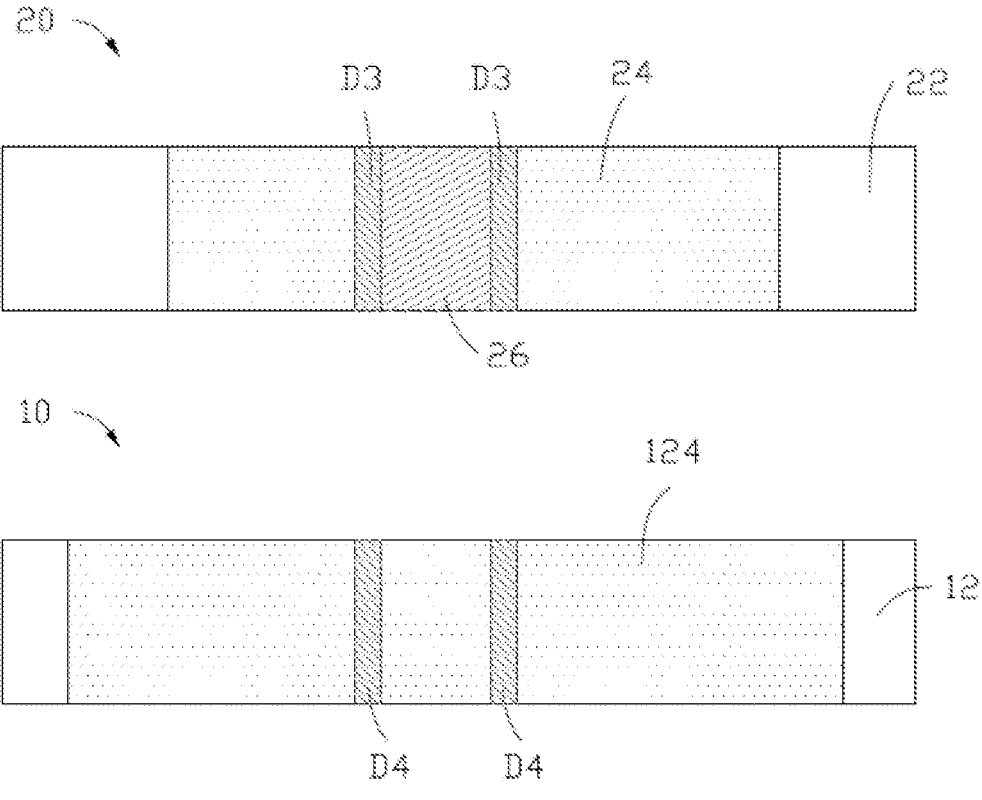
FIG. 4 is a top view of a negative electrode plate and a positive electrode plate according to an embodiment of this application.

As shown in FIG. 2, FIG. 3, and FIG. 4, the negative electrode plate 10 includes a negative current collector 12. The negative current collector 12 includes a first surface 122. A negative active material layer 124 is disposed on the first surface 122.

The positive electrode plate 20 includes a positive current collector 22. The positive current collector 22 includes a second surface 222 facing towards the first surface 122. A positive active material layer 24 is disposed on the second surface 222. The positive active material layer 24 includes a first region D1. The first region D1 includes a second region D2 and a third region D3. The third region D3 is a region that does not overlap the second region D2 by any area in the first region D1. The negative active material layer 124 includes a fourth region D4 facing towards the third region D3.

The first insulation layer 26 is disposed on the surface of the second region D2. The first insulation layer 26 is disposed on a surface of the positive active material layer 24 facing opposite to the positive current collector 22. The first insulation layer 26 may overlap one edge of the negative electrode plate 10 along a width direction of the negative electrode plate 10 (as shown in FIG. 3), or may overlap two opposite edges of the negative electrode plate 10 along the width direction of the negative electrode plate 10 (as shown in FIG. 4), without being limited herein.

The first insulation layer 26 may possess adhesive properties. The first insulation layer 26 may be single-sided tape, double-sided tape, or hot-melt adhesive. Preferably, the first insulation layer 26 is double-sided tape or hot-melt adhesive, both sides of which possess adhesive properties, and can closely bond the positive active material layer 24 to the separator 30 to improve the interface consistency of the electrochemical device 100.

The area of the first region D1 is defined as S1 mm$^2$, and the area of the second region D2 is defined as S2 mm$^2$. The area S1 of the first region D1 and the area S2 of the second region D2 satisfy a relation: $S2 < S1 \leq 1.5 S2$. A ratio (Cell Balance, CB for short) of a unit-area capacity of the fourth region D4 to a unit-area capacity of the third region D3 is greater than or equal to 1.1.

In order to prevent the electrochemical device 100 from short-circuiting, a first insulation layer 26 is disposed on the surface of the positive active material layer 24 in the second region D2. In this way, in a charge-and-discharge process of the electrochemical device 100, lithium ions are still deintercalated from the positive active material located at the edge of the second region D2 and overlaid by the first insulation layer 26. The lithium ions are precipitated on the surface of the fourth region D4. The precipitated lithium metal pierces the separator 30 to cause a short circuit of the electrochemical device 100, thereby impairing safety and reliability.

In this application, by controlling the ratio of the unit-area capacity of the fourth region D4 to the unit-area capacity of the third region D3 to fall within a specified range, the ratio of the quantity of lithium ions that can be intercalated into the fourth region D4 to the quantity of lithium ions that can be deintercalated from the third region D3 falls within a specified range, thereby alleviating the problem of lithium plating on the surface of the negative active material layer 124 and improving safety and reliability of the electrochemical device 100.

In an embodiment of this application, the unit-area capacity of the fourth region D4 is greater than a unit-area capacity of a region of the negative active material layer 124 different from the fourth region D4. The region of the negative active material layer 124 different from the fourth region D4 may a region coated with a normal negative active material, thereby increasing the unit-area capacity of the fourth region D4. This increases the ratio of the unit-area capacity of the fourth region D4 to the unit-area capacity of the third region D3, reduces risks of lithium plating on the surface of the negative active material layer 124 and improves safety and reliability.

Figure 5:
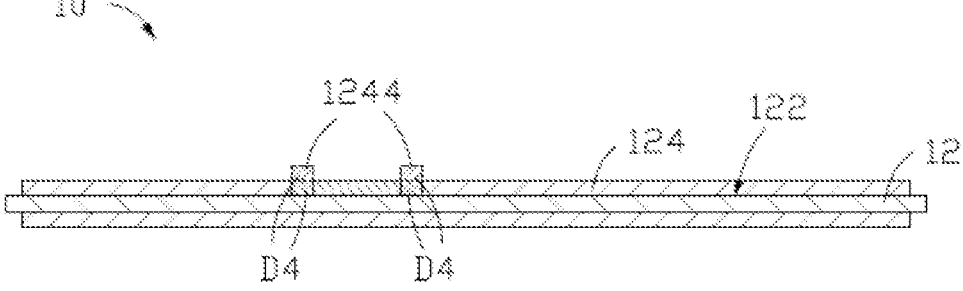
FIG. 5 is a schematic sectional view of a negative electrode plate according to an embodiment of this application.

As shown in FIG. 5, in an embodiment of this application, the region of the negative active material layer 124 different from the fourth region D4 includes a first negative active material. A superficial layer 1244 of the fourth region D4 includes a second negative active material. A gram capacity of the second negative active material is greater than a gram capacity of the first negative active material. The first negative active material is an active material that is normally coated on the negative electrode plate 10. By setting at least a part of the active material in the fourth region D4 to possess a relatively high gram capacity, this embodiment can increase the quantity of lithium ions that can be intercalated into the fourth region D4, reduce risks of lithium plating on the surface of the negative active material layer 124, and improve safety and reliability.

Understandably, the negative active material layer 124 located in the fourth region D4 may include a first negative active material, or may include no first negative active material. To be specific, the thickness of the superficial layer 1244 of the fourth region D4 can be increased by reducing the thickness of the first negative active material located in the fourth region D4, thereby increasing the quantity of lithium ions that can be intercalated into the fourth region D4, reducing risks of lithium plating on the surface of the negative active material layer 124, and improving safety and reliability.

In this application, the superficial layer 1244 of the fourth region D4 is a superficial layer of the negative active material layer 124 in the fourth region D4. In an embodiment, the fourth region D4 is coated with a layer of negative active material, and then further coated with a layer of negative active material to form the superficial layer 1244. In an embodiment, the fourth region D4 is coated with a layer of negative active material, and then a side that is of the fourth region facing opposite to the negative current collector 12 contains a negative active material of a specified thickness, known as the superficial layer 1244. Understandably, the formation manner of the superficial layer 1244 is not limited to the example above.

In an embodiment of this application, a lithiation potential versus Li/Li$^+$ of the second negative active material is 0.2V to 3.0 V. This not only avoids further lithium plating on the second negative active material caused by a deficient lithiation potential (less than 0.2 V) of the second negative active material, but also avoids an excessive lithiation potential (higher than 3.0 V) of the second negative active material. The excessive lithiation potential has to be matched by a positive active material of a higher potential.

In an embodiment of this application, the second negative active material is an active material in which lithium ions can be intercalated. The second negative active material includes, but is not limited to, metal oxide, carbon material, inorganic non-metallic simple substance, silicon-containing compound, or lithium salt. The metal oxide includes transition metal oxide, and the like. The carbon material includes graphene, hard carbon, soft carbon, artificial graphite, natural graphite, mesocarbon microbead, or the like. The inorganic non-metallic simple substance includes silicon, phosphorus, sulfur, or the like. The silicon-containing compound includes silicon-oxygen compound, silicon carbon compound, or the like. The lithium salt includes lithium titanium oxide, or the like. In this way, the second negative active material can have a relatively high grain capacity.

In an embodiment of this application, a thickness of the superficial layer 1244 of the fourth region D4 is less than or equal to 50 μm. By controlling the thickness of the superficial layer 1244 of the fourth region D4, on the one hand, this embodiment controls the thickness of the electrochemical device 100 to be not excessive, and on the other hand, reduces cost on the basis of reducing risks of lithium plating.

In an embodiment of this application, the thickness of the superficial layer 1244 of the fourth region D4 is 1 μm to 50 μm.

In an embodiment of this application, the thickness of the superficial layer 1244 of the fourth region D4 is 1 μm to 25 μm.

In an embodiment of this application, the thickness of the superficial layer 1244 of the fourth region D4 is 3 μm to 10 μm.

Figure 6:
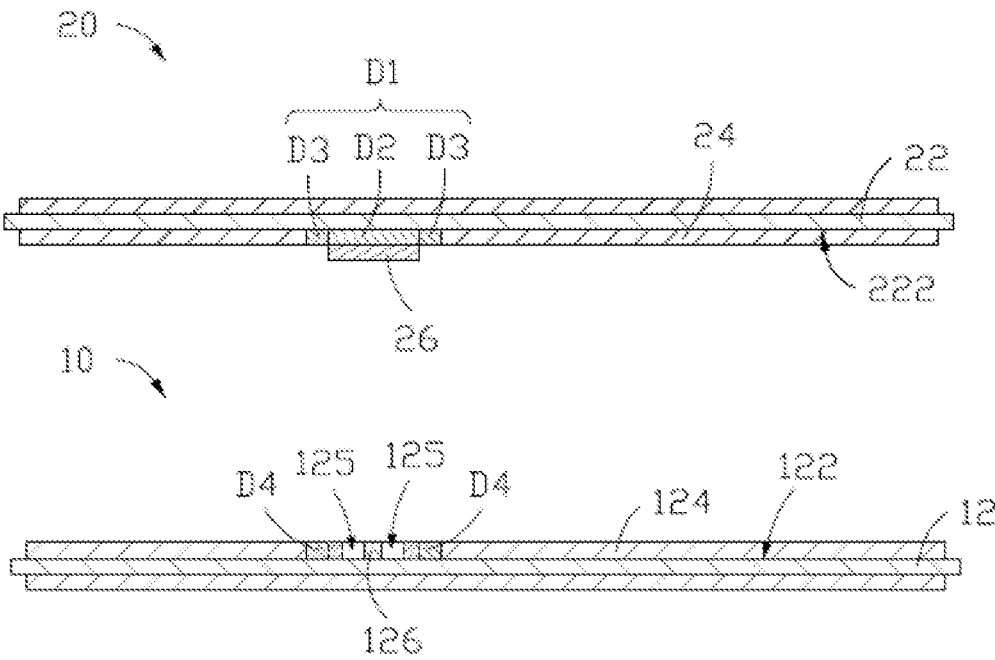
FIG. 6 is a schematic sectional view of a negative electrode plate and a positive electrode plate according to an embodiment of this application.

As shown in FIG. 6, in an embodiment of this application, a groove 125 is provided in a negative active material layer 124. A negative tab 126 is accommodated in the groove 125. The negative tab 126 is electrically connected to the negative current collector 12. A projection of the groove 125 on the positive active material layer 24 is located in the second region D2.

Understandably, the manner of electrical connection between the negative tab 126 and the negative current collector 12 may be, but without being limited to, welding, bonding, or the like, where the welding may be, but without being limited to, resistance welding, ultrasonic welding, laser welding, or the like. The groove 125 may be arranged in the following way: after the first surface 122 of the negative current collector 12 is coated with the negative active material layer 124, the negative active material layer 124 is washed off a position where the negative tabs 126 is located. The washing manner includes, but is not limited to, laser cleaning, or washing by using styrofoam, or the like.

After the negative electrode plate 10, the separator 30, and the positive electrode plate 20 form the electrochemical device 100, the negative active material layer 124 and the positive active material layer 24 are interspaced with, and fit closely with, the separator 30. The second region D2 completely overlays the groove 125.

Figure 7:
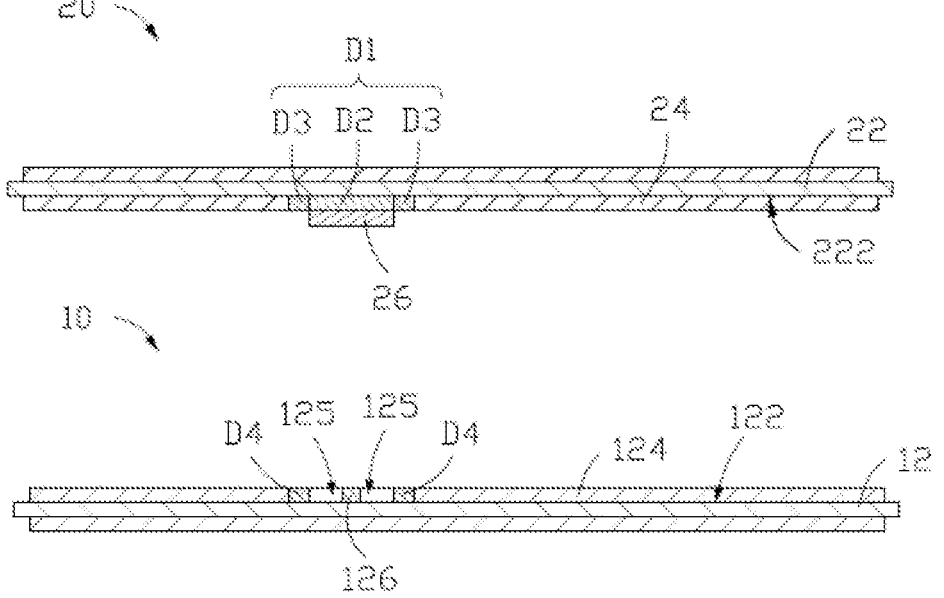
FIG. 7 is a schematic sectional view of a negative electrode plate and a positive electrode plate according to an embodiment of this application.

As shown in FIG. 7, the second region D2 may at least just overlay the groove 125. That is, the area of the second region D2 may be equal to the area of the groove 125, and the second region D2 just overlays the groove 125. The area of the second region D2 may be larger than the area of the groove 125 instead. The width of the groove 125 is 3 mm to 100 mm along a width direction of the negative electrode plate 10. The length of the groove 125 is 3 mm to 100 mm along a direction perpendicular to the width direction of the negative electrode plate 10. The length and width of the groove 125 are selected as required by the process.

Further, the projection of the first insulation layer 26 on the negative active material layer 124 at least completely overlays the groove 125. In this way, in a charge-and-discharge process of the electrochemical device 100, a delithiation reaction of the active material of the second region D2 is hindered by the first insulation layer 26, and the quantity of lithium ions deintercalated will be greatly reduced.

Figure 8:
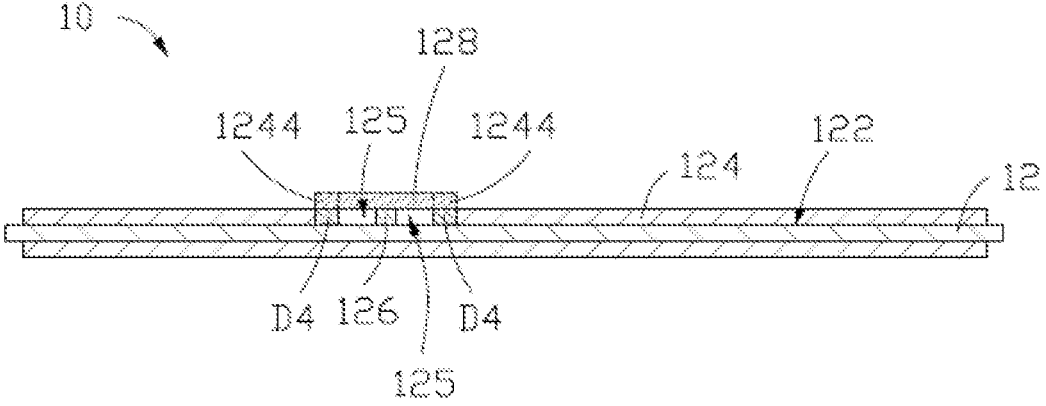
FIG. 8 is a schematic sectional view of a negative electrode plate according to an embodiment of this application.

As shown in FIG. 8, in an embodiment of this application, a second insulation layer 128 is disposed on a surface of the negative tab 126. A distance between a surface that is of a superficial layer 1244 of the fourth region D4 facing opposite to the negative current collector 12 and the negative current collector 12 is less than or equal to a distance between a surface that is of the second insulation layer 128 facing opposite to the negative current collector 12 and the negative current collector 12. Further, the second insulation layer 128 may at least completely overlays the groove 125.

The negative tab 126 undergoes processes such as cutting during manufacture, and metal burs are generated at the edge of the tab. Weld marks and the like are generated when the negative tab 126 is joined (for example, welded) to the negative current collector 12. The second insulation layer 128 disposed on the surface of the negative tab 126 can prevent bus or weld marks from piercing the separator 30, reduce risks of short circuits of the electrochemical device 100, and improve safety and reliability. In addition, the thickness of the superficial layer 1244 of the fourth region D4 is set to be not greater than the thickness of the second insulation layer 128, so that the total thickness of the electrochemical device 100 can be controlled not to be excessively thick.

The second insulation layer 128 may possess adhesive properties. The second insulation layer 128 may be single-sided tape, double-sided tape, hot-melt adhesive, or the like. Preferably, the second insulation layer 128 is double-sided tape or hot-melt adhesive, both sides of which possess adhesive properties, and can closely bond the negative active material layer 124 to the separator 30 to improve the interface consistency of the electrochemical device 100.

Figure 9:
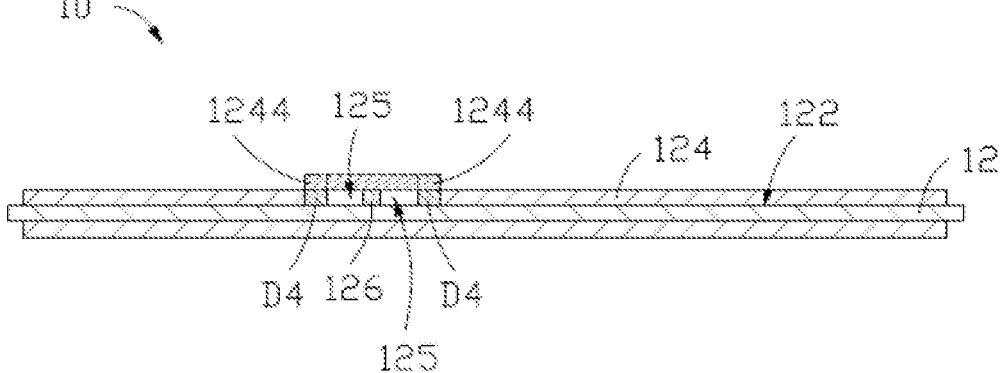
FIG. 9 is a schematic sectional view of a negative electrode plate according to an embodiment of this application.

In an embodiment of this application, the surface of the negative tab 126 is overlaid with the negative active material. On the one hand, this increases the amount of active material of the electrochemical device 100 and increases the energy density. In addition, the negative active material layer that overlays the surface of the negative tab 126 can cover the burrs or weld marks generated in cutting and joining (such as welding) of the negative tab 126, avoid a short circuit caused by piercing of the separator 30, and improve safety and reliability. Further, as shown in FIG. 9, the region located in the negative active material layer 124 and corresponding to the second region D2 is fully overlaid with the negative active material, and is overlaid with the same second negative active material as the superficial layer 1244 of the fourth region D4. Further, the negative active material layer 124 can fill the groove 125.

In an embodiment of this application, the third region includes a first positive active material. A region of the positive active material layer 24 different from the third region D3 includes a second positive active material. The unit-area capacity of the third region D3 is less than a unit-area capacity of the region of the positive active material layer 24 different from the third region D3. By reducing the unit-area capacity of the third region D3, the quantity of lithium ions that can be deintercalated from the third region D3 is less than that in a normal circumstance, thereby increasing the ratio of the unit-area capacity of the fourth region D4 to the unit-area capacity of the third region D3, avoiding lithium plating on the surface of the negative active material layer 124, and improving safety and reliability.

In an embodiment of this application, a gram capacity of the first positive active material is less than a gram capacity of the second positive active material. To be specific, by coating the third region D3 with a positive active material of a relatively low gram capacity, the quantity of lithium ions that can be deintercalated from the first positive active material of the third region D3 is reduced, so as to further avoid lithium plating on the surface of the negative active material layer 124 and improve safety and reliability.

Table 1 enumerates some positive active materials and their gram capacities. The corresponding first positive active material and second positive active material may be selected based on the gram capacities of the positive active materials, and applied to corresponding regions. In the embodiments of this application, one of the following positive active materials may be selected as the first positive active material or the second positive active material. Alternatively, a mixture of two or more selected from the following positive active materials may be applied to the corresponding regions. However, understandably, Table 1 merely enumerates some of the positive active materials as examples, and the implementation of this application is not limited to the enumerated positive active materials. In addition, the gram capacity set out in Table 1 is the gram capacity actually achievable by the positive active material. Modification of the positive active material will change the gram capacity to some extent.

TABLE 1

| Molecular formula of positive active material | Abbreviation | Gram capacity (mAh/g) | Average voltage (vs Li/Li$^+$) |
|---|---|---|---|
| $LiCoO_2$-140 | LCO-140 | 140 | 3.8 |
| $LiCoO_2$-180 | LCO-180 | 180 | 4.3 |
| $LiCoO_2$-220 | LCO-220 | 220 | 4.3 |
| $LiMn_2O_4$ | LMO | 130 | 4.05 |
| $LiFePO_4$ | LFP | 160 | 3.4 |
| $LiCoPO_4$ | LCP | 130 | 4.8 |
| $LiNiO_2$ | LNO | 200 | 3.7 |
| $LiNi_{0.33}Mn_{0.33}Co_{0.33}O_2$ | NCM333 | 160 | 3.7 |
| $LiNi_{0.5}Mn_{0.2}Co_{0.3}O_2$ | NCM523 | 180 | 3.7 |
| $LiNi_{0.6}Mn_{0.2}Co_{0.2}O_2$ | NCM622 | 200 | 3.7 |
| $LiNi_{0.8}Mn_{0.1}Co_{0.1}O_2$ | NCM811 | 220 | 3.7 |
| $xLi_2MnO_3(1-x)LiMO_2(M{=}Ni,Co,Mn)$-250 | Li-rich-250 | 250 | 3.75 |
| $xLi_2MnO_3(1-x)LiMO_2(M{=}Ni,Co,Mn)$-280 | Li-rich-280 | 280 | 3.75 |
| $xLi_2MnO_3(1-x)LiMO_2(M{=}Ni,Co,Mn)$-300 | Li-rich-300 | 300 | 3.75 |
| $LiNi_{0.8}Co_{0.15}Al_{0.05}O_2$-180 | NCA-180 | 180 | 3.7 |
| $LiNi_{0.8}Co_{0.15}Al_{0.05}O_2$-200 | NCA-200 | 200 | 3.7 |
| $LiNi_{0.8}Co_{0.15}Al_{0.05}O_2$-220 | NCA-220 | 220 | 3.7 |
| $LiNi_{0.5}Mn_{1.5}O_4$ | LNM | 135 | 4.7 |
| $Li_3V_2(PO_4)_3$ | LVP | 180 | 3.8 |

Figure 10:
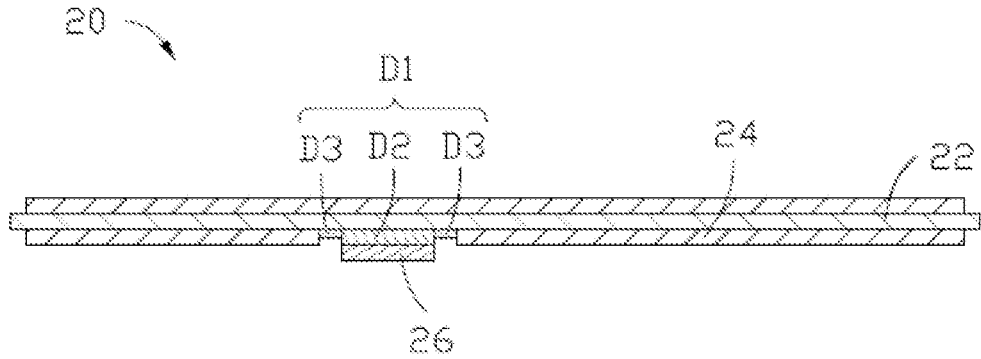
FIG. 10 is a schematic sectional view of a positive electrode plate according to an embodiment of this application.

As shown in FIG. 10, in an embodiment of this application, the thickness of the positive active material layer 24 located in the third region D3 is less than the thickness of the positive active material layer 24 in a region of the positive active material layer 24 different from the third region D3. With the decrease of the thickness of the positive active material layer 24 in the third region D3, the lithium ions that can be deintercalated from the third region are reduced, thereby further avoiding lithium plating on the surface of the negative electrode plate 10 and improving safety and reliability.

Figure 11:
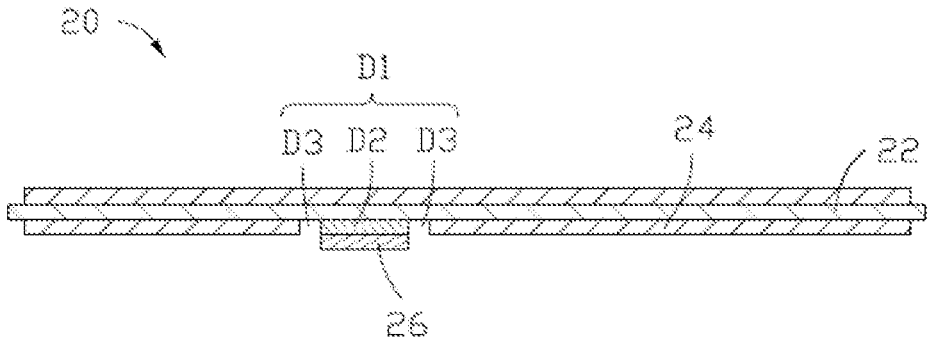
FIG. 11 is a schematic sectional view of a positive electrode plate according to an embodiment of this application.

As shown in FIG. 11, in an embodiment of this application, the third region D3 is provided without the positive active material layer 24. That is, the thickness of the positive active material layer 24 of the third region D3 is reduced to zero. The third region D3 is not coated with the positive active material, thereby avoiding lithium plating on the surface of the negative active material layer 124 and improving safety and reliability.

Figure 12:
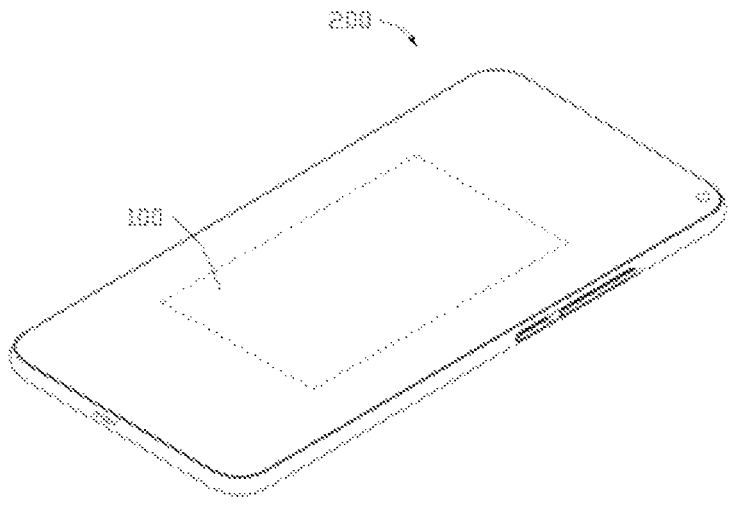
FIG. 12 is an schematic structural diagram of an electronic device according to an embodiment of this application.

This application further provides an electronic device 200. The electronic device 200 includes the electrochemical device 100. The electronic device 200 may be a consumer electronic products (such as a mobile communication device, a tablet computer, a notebook computer, or a wearable device), a power tool, an unmanned aerial vehicle, an energy storage device, a power device, or the like. Referring to FIG. 12, in an embodiment, the electronic device 200 is a mobile communication device.

The electrochemical device 100 according to this application increases the unit-area capacity of the fourth region D4 on the one hand, and on the other hand, reduces the unit-area capacity of the third region D3, so that the ratio of the unit-area capacity of the fourth region D4 to the unit-area capacity of the third region D3 is greater than or equal to 1.1, thereby solving the problem of lithium plating on the corresponding negative active material layer 124 in the regions around the first insulation layer 26 to improve safety and reliability of the electrochemical device 100.

The foregoing embodiments are merely intended for describing the technical solutions of this application but not intended as a limitation. Although this application is described in detail with reference to the foregoing optional embodiments, a person of ordinary skill in the art understands that modifications or equivalent substitutions may be made to the technical solutions of this application without departing from the spirit and scope of the technical solutions of this application.

What is claimed is:

1. An electrochemical device, comprising:
a negative electrode plate comprising a negative current collector, wherein the negative current collector comprises a first surface, and a negative active material layer is disposed on the first surface; and
a positive electrode plate comprising a positive current collector, wherein the positive current collector comprises a second surface facing towards the first surface, and a positive active material layer is disposed on the second surface;
wherein the positive active material layer comprises a first region, the first region comprises a second region and a third region, a first insulation layer is disposed on a surface of the second region, the third region is a region that does not overlap the second region by any area in the first region, and the negative active material layer comprises a fourth region facing towards and corresponding to the third region;
wherein a unit-area capacity of the third region is less than a unit-area capacity of the region of the positive active material layer different from the third region;
wherein a unit-area capacity of the fourth region is greater than a unit-area capacity of a region of the negative active material layer different from the fourth region;
wherein an area S2 mm$^2$ of the second region and an area S1 mm$^2$ of the first region satisfy a relation: S2<S1≤1.5S2, and a ratio CB of the unit-area capacity of the fourth region to the unit-area capacity of the third region is greater than or equal to 1.1.

2. The electrochemical device according to claim 1, wherein the region of the negative active material layer different from the fourth region comprises a first negative active material, a superficial layer of the fourth region comprises a second negative active material, and a gram capacity of the second negative active material is greater than a gram capacity of the first negative active material.

3. The electrochemical device according to claim 2, wherein a lithiation potential versus Li/Li$^+$ of the second negative active material is 0.2 V to 3.0 V.

4. The electrochemical device according to claim 2, wherein the second negative active material comprises at least one of transition metal oxide, lithium titanium oxide, graphene, hard carbon, soft carbon, silicon, silicon-oxygen compound, silicon-carbon compound, artificial graphite, natural graphite, mesocarbon microbead, phosphorus, or sulfur.

5. The electrochemical device according to claim 2, wherein a thickness of the superficial layer of the fourth region is less than or equal to 50 μm.

6. The electrochemical device according to claim 1, wherein a groove is provided in the negative active material layer, a negative tab is accommodated in the groove, the negative tab is electrically connected to the negative current collector, and a projection of the groove on the positive active material layer is located in the second region.

7. The electrochemical device according to claim 6, wherein the area of the second region is equal to an area of the groove.

8. The electrochemical device according to claim 6, wherein a second insulation layer is disposed on a surface of the negative tab, and a distance between a surface of the superficial layer of the fourth region facing opposite to the negative current collector and the negative current collector is less than or equal to a distance between a surface of the second insulation layer facing opposite to the negative current collector and the negative current collector.

9. The electrochemical device according to claim 6, wherein a surface of the negative tab is overlaid with the negative active material layer.

10. The electrochemical device according to claim 1, wherein the third region comprises a first positive active material, and a region of the positive active material layer different from the third region comprises a second positive active material.

11. The electrochemical device according to claim 10, wherein a gram capacity of the first positive active material is less than a gram capacity of the second positive active material.

12. The electrochemical device according to claim 10, wherein a thickness of the third region is less than a thickness of the region of the positive active material layer different from the third region.

13. The electrochemical device according to claim 12, wherein the third region is provided without the positive active material layer.

14. The electrochemical device according to claim 1, wherein the third region is adjacent to the second region, and the first insulation layer is disposed exclusively on the surface of the second region and does not extend onto a surface of the third region.

15. An electronic device, comprising an electrochemical device, the electrochemical device comprises:
a negative electrode plate comprising a negative current collector, wherein the negative current collector comprises a first surface, and a negative active material layer is disposed on the first surface; and
a positive electrode plate comprising a positive current collector, wherein the positive current collector comprises a second surface facing towards the first surface, and a positive active material layer is disposed on the second surface;
wherein the positive active material layer comprises a first region, the first region comprises a second region and a third region, a first insulation layer is disposed on a surface of the second region, the third region is a region that does not overlap the second region by any area in the first region, and the negative active material layer comprises a fourth region facing towards and corresponding to the third region;
wherein a unit-area capacity of the third region is less than a unit-area capacity of the region of the positive active material layer different from the third region;
wherein a unit-area capacity of the fourth region is greater than a unit-area capacity of a region of the negative active material layer different from the fourth region;
wherein an area S2 mm$^2$ of the second region and an area S1 mm$^2$ of the first region satisfy a relation: S2<S1≤1.5S2, and a ratio CB of the unit-area capacity of the fourth region to the unit-area capacity of the third region is greater than or equal to 1.1.

16. The electronic device according to claim 15, wherein the region of the negative active material layer different from the fourth region comprises a first negative active material, a superficial layer of the fourth region comprises a second negative active material, and a gram capacity of the second negative active material is greater than a gram capacity of the first negative active material.

17. The electronic device according to claim 16, wherein a lithiation potential versus Li/Li$^+$ of the second negative active material is 0.2 V to 3.0 V.

18. The electronic device according to claim 15, wherein a groove is provided in the negative active material layer, a negative tab is accommodated in the groove, the negative tab is electrically connected to the negative current collector, and a projection of the groove on the positive active material layer is located in the second region.

19. The electronic device according to claim 15, wherein the third region comprises a first positive active material, a region of the positive active material layer different from the third region comprises a second positive active material.

\* \* \* \* \*